(12) United States Patent
Said

(10) Patent No.: US 9,232,123 B2
(45) Date of Patent: Jan. 5, 2016

(54) SYSTEMS AND METHODS FOR ACQUIRING AND PROCESSING IMAGE DATA PRODUCED BY CAMERA ARRAYS

(75) Inventor: Amir Said, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 194 days.

(21) Appl. No.: 13/878,053

(22) PCT Filed: Oct. 6, 2010

(86) PCT No.: PCT/US2010/051661
§ 371 (c)(1),
(2), (4) Date: Apr. 5, 2013

(87) PCT Pub. No.: WO2012/047216
PCT Pub. Date: Apr. 12, 2012

(65) Prior Publication Data
US 2013/0188068 A1    Jul. 25, 2013

(51) Int. Cl.
*H04N 5/225* (2006.01)
*H04N 5/341* (2011.01)
(Continued)

(52) U.S. Cl.
CPC .............. *H04N 5/2258* (2013.01); *G03B 37/04* (2013.01); *H04N 5/2259* (2013.01); *H04N 5/23203* (2013.01); *H04N 5/23229* (2013.01); *H04N 5/23238* (2013.01); *H04N 5/247* (2013.01); *H04N 5/2628* (2013.01); *H04N 5/3415* (2013.01); *G03B 35/08* (2013.01); *G06T 2200/21* (2013.01); *G06T 2200/32* (2013.01)

(58) Field of Classification Search
CPC .............. H04N 5/2258; H04N 5/2259; H04N 5/23203; H04N 5/23238; H04N 5/2628; H04N 5/3415; H04N 5/345; G03B 37/04

USPC ................... 348/207.1, 207.11, 211.3–211.6, 348/211.11, 218.1, 262, 264
See application file for complete search history.

(56) References Cited

U.S. PATENT DOCUMENTS

| 6,002,743 A | 12/1999 | Telymonde |
| 6,750,904 B1 * | 6/2004 | Lambert ..................... 348/218.1 |

(Continued)

FOREIGN PATENT DOCUMENTS

| EP | 1 635 293 A1 | 5/2006 |
| WO | 2009/054683 A1 | 4/2009 |

OTHER PUBLICATIONS

International search report and written opinion in priority PCT patent application PCT/US2010/051661, dated Jul. 7, 211.

(Continued)

*Primary Examiner* — Daniel M Pasiewicz
(74) *Attorney, Agent, or Firm* — Hewlett-Packard Patent Department

(57) ABSTRACT

This disclosure is directed to camera systems including a camera array, data buses shared by the cameras, and one or more processors that process images captured by the camera array. In one aspect, a camera system (450) includes a camera array (452), a controller (454), a number of camera buses (458-465), and a computing device (456) connected to the controller. Each camera is connected to one or more adjacent cameras and includes one or more processors. Each camera bus connects a subset of cameras of the camera array to the controller. And each camera can be operated to send to the controller only the image data used by the computing device to generate virtual images and receive instructions from the controller over a camera bus.

20 Claims, 13 Drawing Sheets

(51) Int. Cl.
  *H04N 5/232* (2006.01)
  *H04N 5/247* (2006.01)
  *H04N 5/262* (2006.01)
  *G03B 37/04* (2006.01)
  *G03B 35/08* (2006.01)

(56) References Cited

U.S. PATENT DOCUMENTS

| | | | |
|---|---|---|---|
| 7,277,118 | B2 | 10/2007 | Foote |
| 7,538,797 | B2 | 5/2009 | Li et al. |
| 8,125,531 | B2* | 2/2012 | Van Geel et al. ........... 348/218.1 |
| 2002/0122113 | A1* | 9/2002 | Foote .............................. 348/48 |
| 2003/0132951 | A1* | 7/2003 | Sorokin et al. ................. 345/700 |
| 2003/0184550 | A1* | 10/2003 | Nally ............................. 345/531 |
| 2010/0149358 | A1* | 6/2010 | Shioya et al. ............... 348/218.1 |
| 2014/0139610 | A1* | 5/2014 | Weber et al. ................ 348/14.03 |

OTHER PUBLICATIONS

W. Wolf et al., "Architectures for distributed smart cameras," Proceedings of ICME 2003, dated Aug. 11-13, 2003.

X. Zhu et al., "Distributed compression for large camera arrays," 2003 IEEE Workshop on Statistical Signal Processing, dated Sep. 28-Oct. 1, 2003.

T. Yan et al., "Distributed image search in camera sensor networks," Proceedings of SynSys 2008, dated Nov. 5-7, 2008.

* cited by examiner

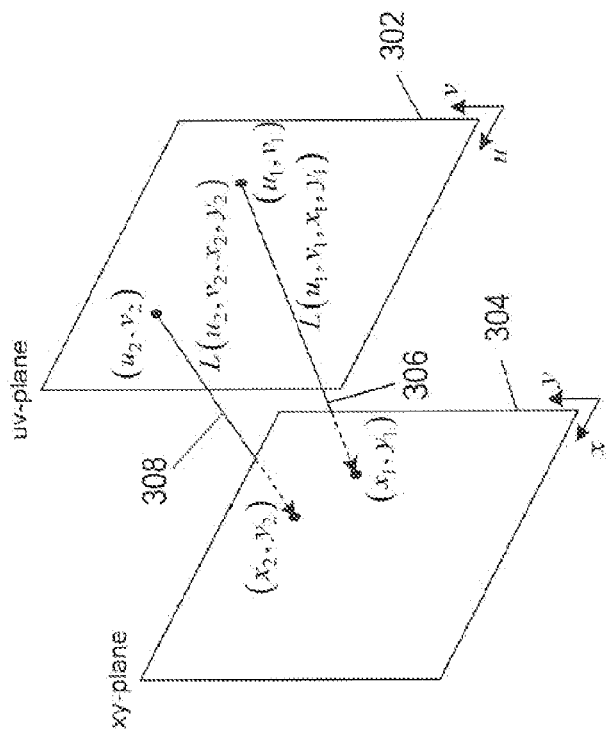
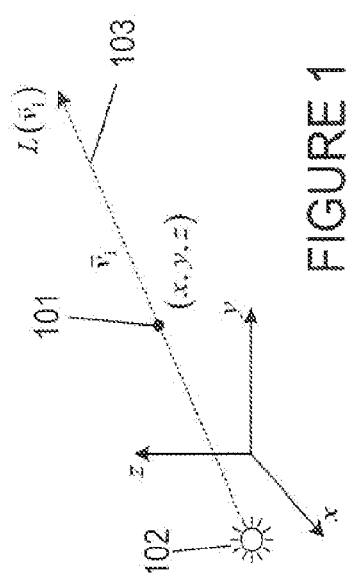
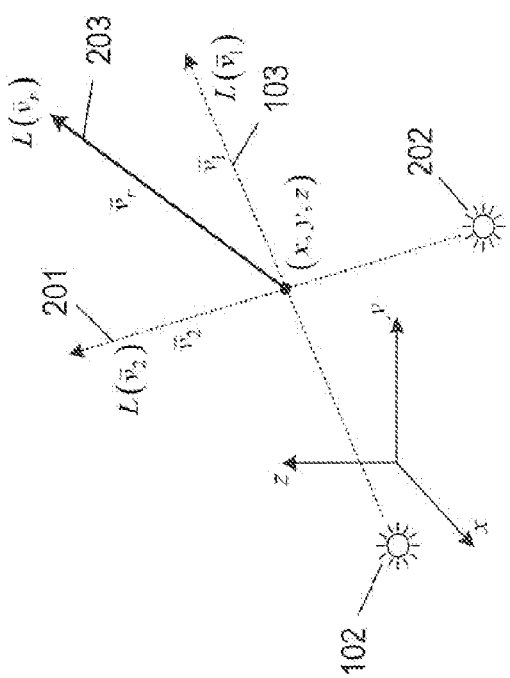
FIGURE 1
FIGURE 2
FIGURE 3

SYSTEMS AND METHODS FOR ACQUIRING AND PROCESSING IMAGE DATA PRODUCED BY CAMERA ARRAYS

TECHNICAL FIELD

This disclosure is directed to camera arrays, and in particular, to systems for processing images produced by camera arrays.

BACKGROUND

Computational photography is a technique to create images using a computer and a variety of data processing methods, which are applied to a number of digital images taken from different view points. The resulting photographic images are, in some cases, the same as those that would have been created by a single camera with characteristics that would be too difficult or expensive to manufacture. For example, it is possible to generate images or a video like those captured from cameras with large lenses or unusual optics. It is also possible to create synthetic or virtual images as if they were taken from an inaccessible position. Image-based rendering is as related technique used to create photorealistic images of a real scene that is also based on a set of two-dimensional images of the scene captured from different view points, but in this ease, the set of two-dimensional images is used to compose a three-dimensional model that can be used to render images of novel views of the scene not captured in the original set of two-dimensional images.

In both techniques, the generation of virtual images is based on the concept of light-fields, which model the distribution of light intensity and propagation in a scene. A fundamental component of these imaging methods is the acquisition of information about the light field using several views. For example, light-field measurements can be performed by moving a single camera to capture images of a static scene from different viewing positions. However, in general, the quality of the synthetic views depends on the number and resolution of those views, so it can be much more convenient to capture the light field using arrays with a large number of cameras.

In recent years, with the advent of inexpensive digital image sensors and advances in semiconductor device miniaturization larger amounts of computing power is available for processing images at a lower cost. These new innovations were expected reduce the cost of rendering images captured using camera arrays. However, the cost of image rendering using images obtained from camera arrays has actually increased. The problem is not due to the price of individual components, integration, or assembly, but is instead due to the high cost of acquiring and simultaneously transmitting the large amounts of image and video data captured by the cameras to a single computing device for processing. For example, an array of 25×25 Mpixel cameras (high-definition video), each camera operated at 30 frames/second, generates 112 Gbytes/second, with nearly 4 Gbytes for each frame. An increasing demand for higher camera resolution, video quality, and a broad range of virtual camera views have also contributed to the increased cost of rendering images acquired using camera arrays.

Developers and users of camera arrays continue to seek systems that lower the cost of image rendering.

BRIEF DESCRIPTION OF THE DRAWINGS

FIG. 1 shows a vector representation of a ray of light passing through a point in three-dimensional space.

FIG. 2 shows a vector representation of two rays of light comprising a light field passing through a point in three-dimensional space.

FIG. 3 shows a two-plane parameterization of a light field.

DETAILED DESCRIPTION

Figure 4A:
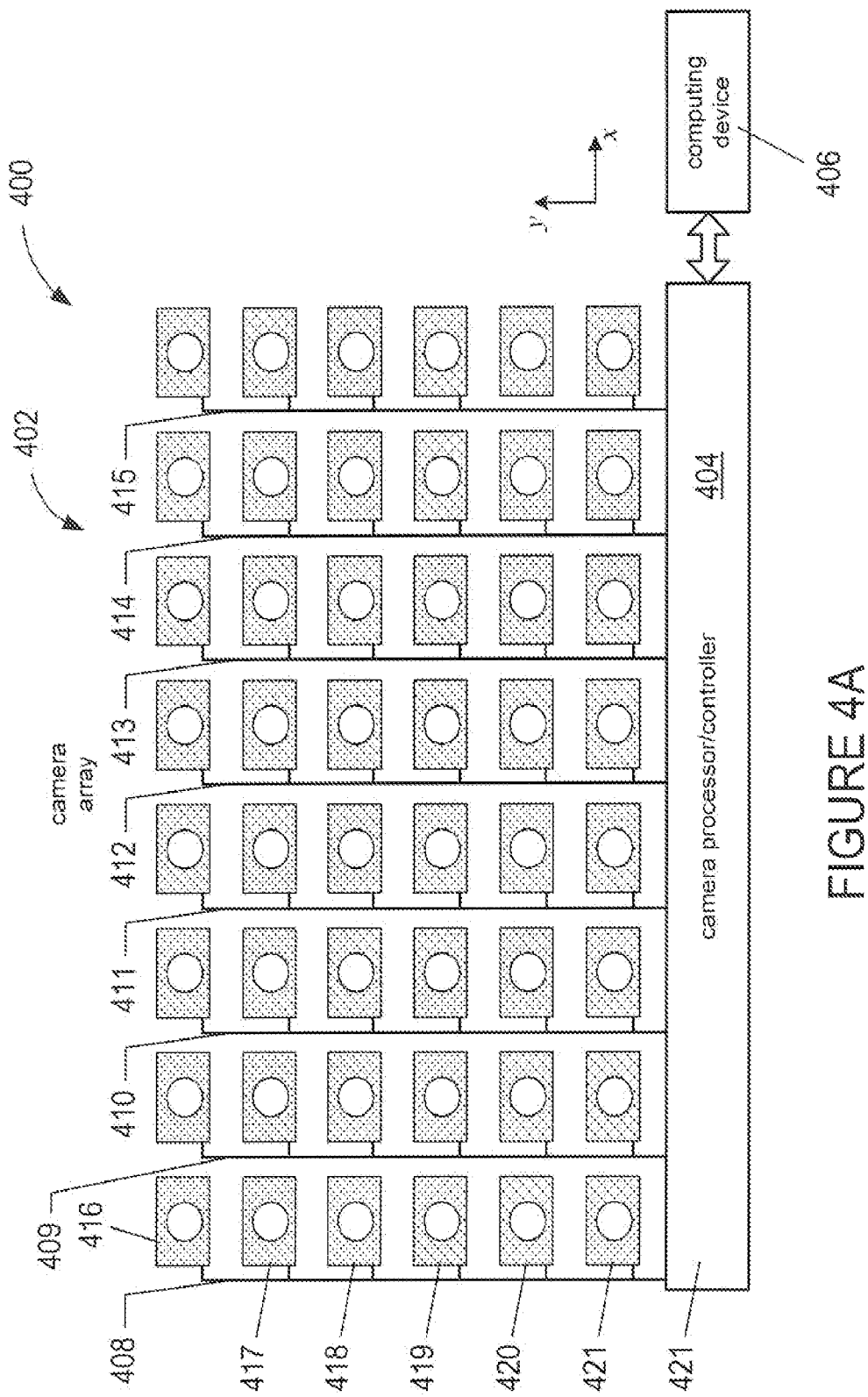
FIG. 4A shows an example of a first camera system.

This disclosure is directed to camera systems including as camera array, data buses shared by the cameras, and at least one processor that process images captured by the camera array. The camera array captures the light field of a scene in a set of images that are processed to create a variety of different viewing experiences of the scene using only portions of the image data collected by the camera array. The detailed description includes a brief general description of light fields in a first subsection followed by a description of various camera systems.

The Light Field

In geometric optics, a ray of light traveling through space can be characterized by a vector, the length of which corresponds to the amount of light, or radiance, traveling in the direction of the ray. The radiance along as vector representing a ray of light in three-dimensional space is characterized by as plenoptic function, which is often used in computer graphics and computer visualization to characterize an image of a scene from many different viewing locations at any viewing angle and at any point in time. For the sake of simplicity, the plenoptic function can be parameterized as a five-dimensional function with three Cartesian coordinates x, y, and z and two spherical coordinate angles $\theta$ and $\phi$. Note that the plenoptic function can also be parameterized by additional dimensions including time and wavelength.

FIG. 1 shows a vector representation of a ray of light passing through a point 101 in three-dimensional space. In the example of FIG. 1, the location of the point 101 in three-dimensional space is characterized by Cartesian coordinates (x, y, z), and the direction of a ray of light emanating from a point source 102 passes through the point 101 is represented by a vector $\bar{v}_1$ 103. The plenoptic function $L(\bar{v}_1)$ is the radiance of the light passing through the point 101 with the direction represented by the vector $\bar{v}_1$ 103.

A light field at a point in space is a function that characterizes the amount of light traveling in all directions through the point. In other words, the light field can be treated as a collection of vectors, each vector representing a ray of light emanating from a different light source With each vector corresponding to a different direction light passes through the point. Summing all vectors passing through a single point, or over an entire sphere of directions, produces a single scalar value at the point called the total irradiance and a resultant vector, which is also a five-dimensional plenoptic function.

FIG. 2 shows a vector representation of two rays of light comprising a light field passing through the point 101 in three-dimensional space. As described above with reference to FIG. 1, the ray represented by the vector $\bar{v}_1$ 103 emanates from the point source 102, and a second ray passing through the same point 101 is represented by a second vector $\bar{v}_2$ 201 emanating from a second point source 202 with a plenoptic function $L(\bar{v}_2)$. The two vectors $\bar{v}_1$ 103 and $\bar{v}_2$ 201 correspond to the light field at the point 101. Summing the vectors $\bar{v}_1$ 103 and $\bar{v}_2$ 201 gives a resultant vector $\bar{v}_r$ 203 and the length of the vector $\bar{v}_r$ corresponds to the total irradiance, which are characterized by a plenoptic function $L(\bar{v}_r)$. The vector valued plenoptic function $L(\bar{v}_r)$ represents the brightest direction along which the point (x y, z) 101 can be viewed.

The parameterization of the light-field or plenoptic function is not unique. FIG. 3 shows an alternative two-plane parameterization of a light field. In FIG. 3, uv-plane 302 and xy-plane 304 are parallel planes used to parameterize the rays of light passing through the planes 302 and 304 and are referred to as the light slab. The uv-plane 302 is often referred to as the camera plane, and the xy-plane 304 is often referred to as the image plane. Only rays with (u, v) and (x, y) coordinates inside both quadrilaterals are represented in the light slab. In other words, the light slab represents the beam of light entering one quadrilateral (e.g., uv-plane 302) and exiting another quadrilateral (e.g., st-plane 304). Each image pixel (x, y) in the xy-plane 304 corresponds to a ray passing through the planes 302 and 304. The plenoptic function L(u, v, x, y) associated with each ray is parameterized by one point in the uv-plane 302 and one point in the xy-plane 304. FIG. 3 shows an example of two plenoptic function characterizations of rays 306 and 308 passing through the slab. Each perspective view image corresponds to all the rays emanating from the uv-plane 302 and arriving at one point in the xy-plane 304. The light field is the collections of images taken from points in the xy-plane 104.

Independent of the choice of parameterization, the plenoptic function can be measured using a digital camera. However, for a given image, the camera can only be at one position in space, and the data associated with the image is two-dimensional. The image is represented as a set of samples of the plenoptic function in a region of a two-dimensional plane embedded in the light-field's four-dimensional space. For example, a single image can be represented by the fixed x and y position of the camera, with pixel coordinates corresponding to dimensions u and v. Thus, for full characterization of the light field x and y positions are varied, which can be done by moving the camera or using an array with many cameras at different positions.

Conversely, while camera arrays have enough cameras to enable a wide range of imaging options, once a specific image is chosen, not all of the image data from all of the cameras is needed. The present invention is related to systems and methods to intelligently select a protocol for data acquisition and transmission that minimize costs.

Camera Systems

FIG. 4A shows an example of a first camera system 400. The system 400 includes a camera array 402 composed of 48 individual cameras, a camera processor/controller 404, and a computing device 406. In the example of FIG. 4A, the system 400 includes eight camera buses 408-415. Each camera bus connects a subset of eight cameras of the camera array 402 to the camera processor/controller 404. For example, each camera in column of cameras 416-421 is connected to the camera bus 408 and sends image data and receives instructions over the camera bus 408. The camera processor/controller 404 includes a controller that manages sending image data captured by the cameras to the computing device 406 and sending instructions from the computing device 406 to the individual cameras. For example, the computing device 406 sends instructions to at least one camera to send only the image data (i.e., pixel values) used to generate an image to be processed by the computing device 406. The camera processor/controller 404 also controls the operation of each camera of the camera array by sending instructions to each camera of the camera array over a connected camera bus. The computing device 406 can direct each camera to send to the camera processor/controller 404 only the image data used by the computing device 406 to generate virtual images of different perspective views of scene.

Figure 4B:
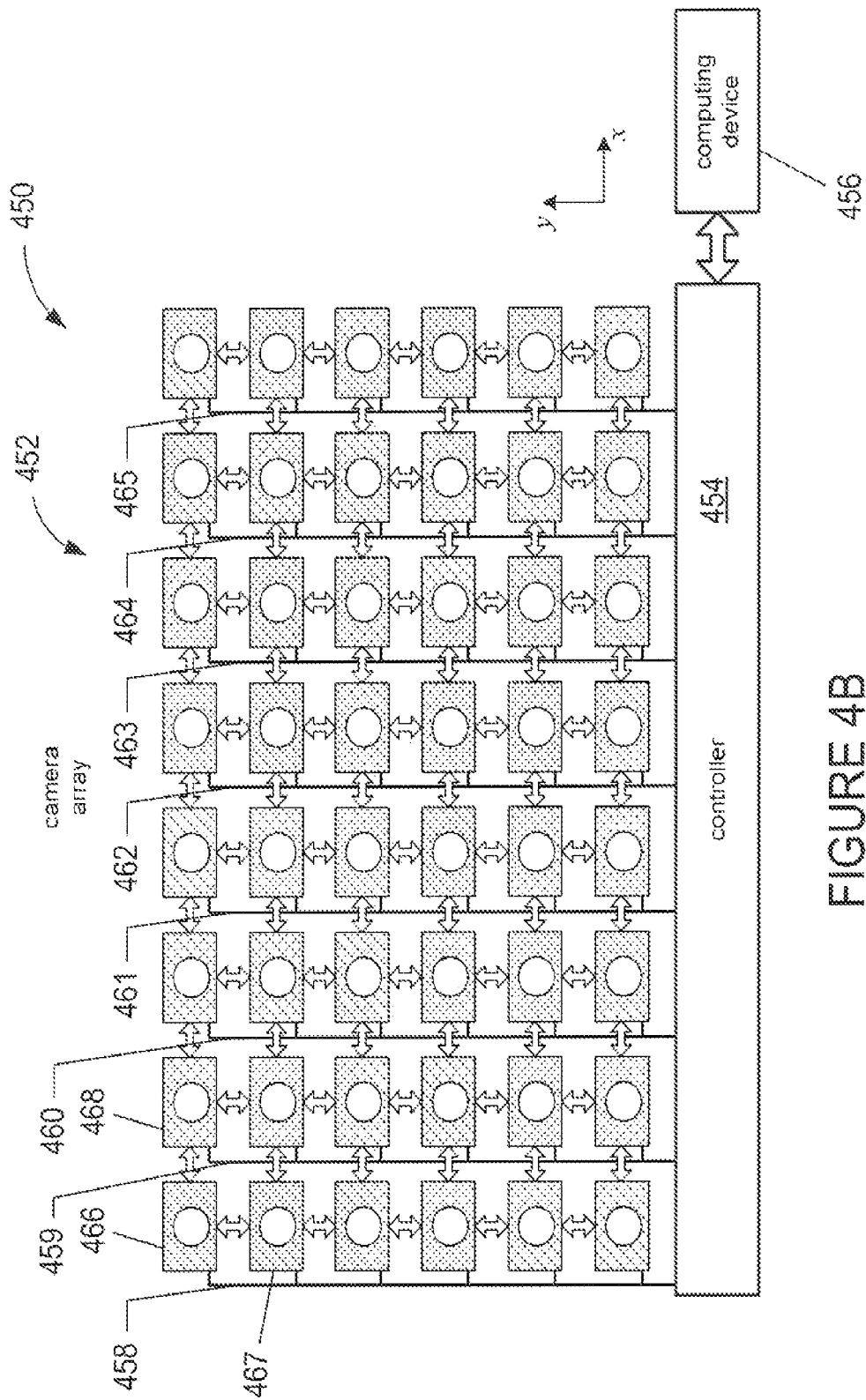
FIG. 4B shows an example of a second camera system.

FIG. 4B shows an example of a second camera system 450. The system 450 includes a camera array 452 composed of 48 individual cameras, a controller 454, and computing device 456. Like the camera system 400, the example system 450 also includes eight camera buses 458-465. Each camera has connects a subset of eight cameras of the camera array 452 to the controller 454. The controller 454 is connected to the computing device 456 and manages sending image data captured by the cameras to the computing device 456 and sending instructions from the computing device 456 to the individual cameras. However, unlike the camera system 400, each camera in the camera array 452 is connected to at least two other adjacent cameras and includes a processor for performing image processing. Double-headed arrows identify connected cameras that can exchange image data for image processing. For example, camera 466 is connected to cameras 467 and 468. The camera 466 can exchange image data with cameras 467 and 468 or exchange information about the images captured by other adjacent cameras. In alternative embodiments, each camera is configured to perform image processing and send the processed image data to the controller 454, which forwards the image data to the computing device 456. In still other embodiments, each camera can be directed by the computing device 456 to process images captured by the camera and adjacent connected cameras in a particular manner and send the processed images to the computing device 456 when finished. The computing device 456 can direct each camera to collect, process, and send to the controller 454 only the image data used by the computing device 456 to generate virtual images of different perspective views of scene.

Figure 5B:
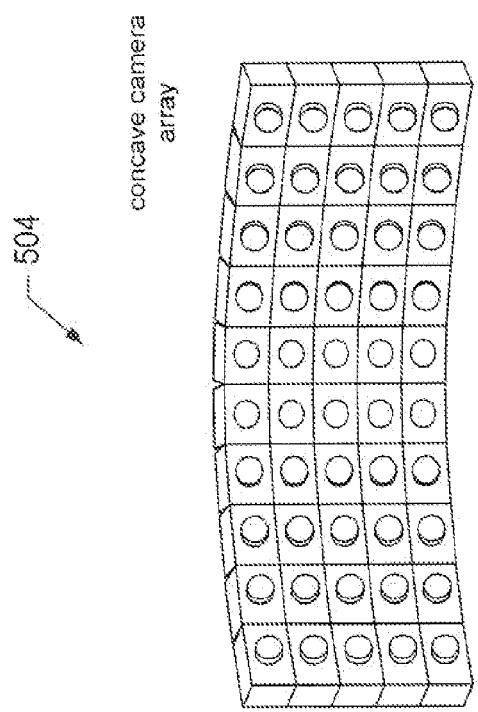
FIGS. 5A-5D show four examples of arrangements of camera arrays.
Figure 5D:
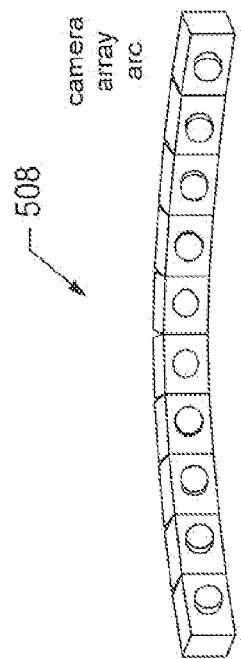
Figure 5A:
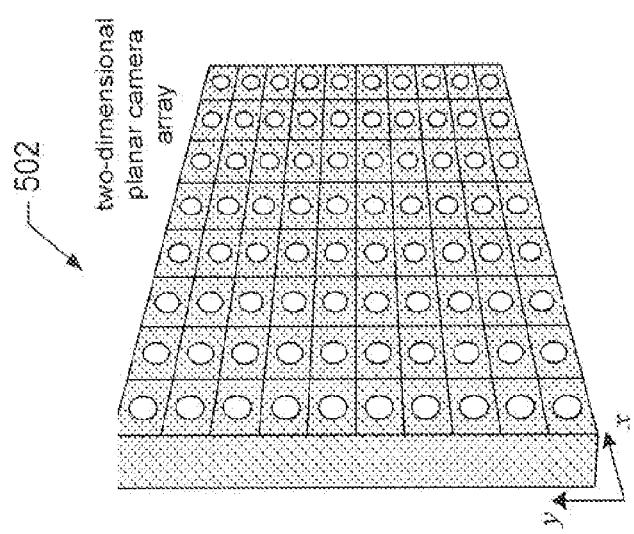
Figure 5C:
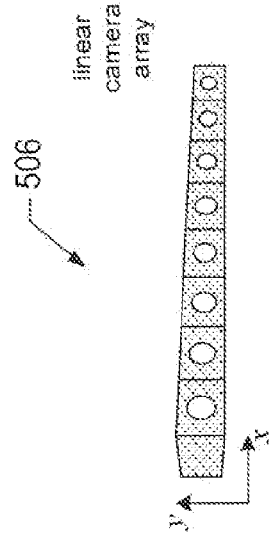

Camera arrays are not limited to the 48 cameras of the systems 400 and 450. In general, the camera array of a camera system can include any number of cameras and the cameras can be arranged in any suitable manner. FIGS. 5A-5D show four examples of arrangements of camera arrays. In FIG. 5A, a camera array 502 is composed of a two-dimensional planar arrangement of 80 cameras. In FIG. 5B, a camera array 504 is composed of a concave arrangement of 50 cameras. In FIG. 5C, a camera array 506 is composed of as linear arrangement of 8 cameras. In FIG. 5D, a camera array 508 is composed of an arc-like arrangement of 10 cameras. Note that camera arrays of the present invention are not limited to the arrangements shown in FIGS. 5A-5D. The cameras comprising a camera array of a camera system can be arranged in any suitable manner including convex, diagonal, or random arrangements to capture images comprising the light field of a scene. Each camera in a camera array can be connected to at least one camera in the same array in order to exchange and process image data as described above for the camera system 450.

Figure 6A:
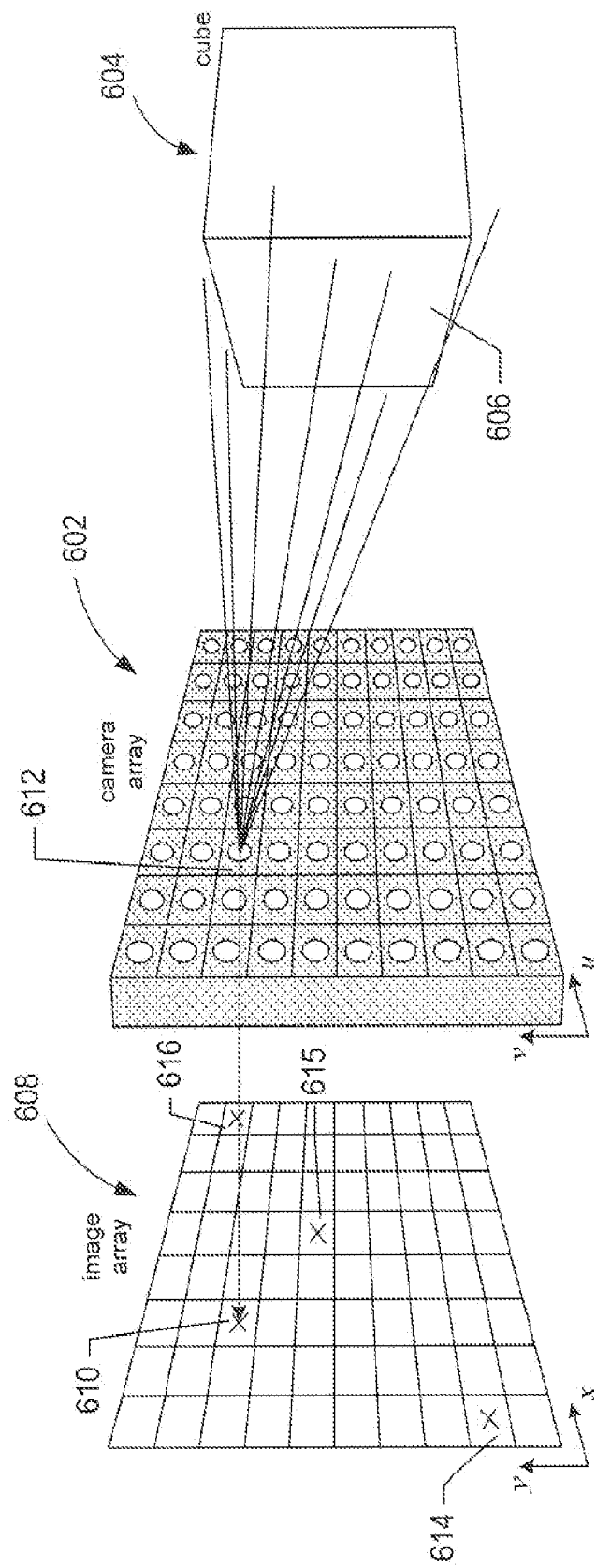
FIGS. 6A-6B show a perspective view of an example two-dimensional planar camera array of a camera system and examples of real images captured by certain cameras.
Figure 6B:
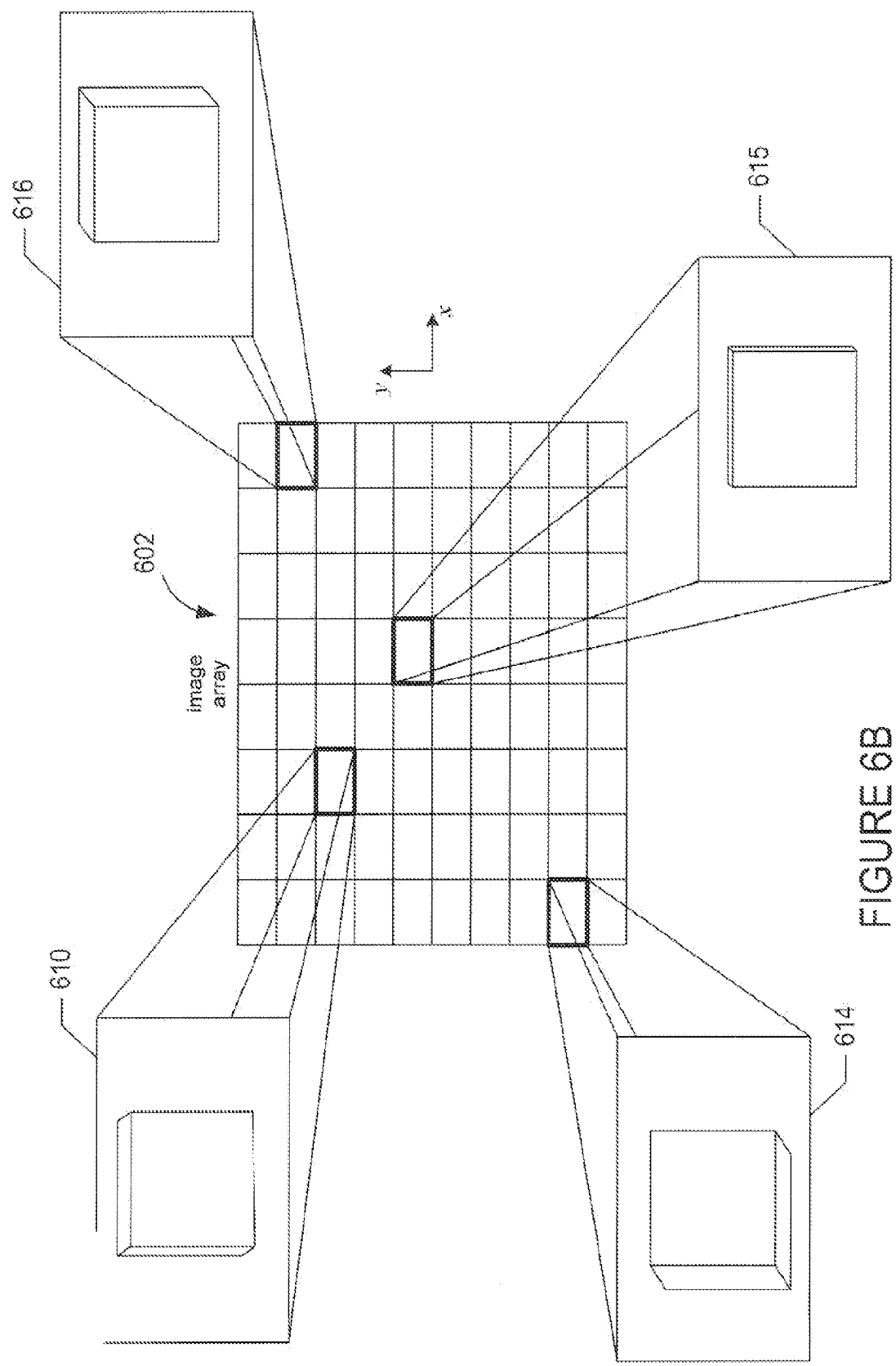

Each camera of a camera array captures a different perspective view real image of a scene. Note that the term "real image" is used to refer to an image captured by a camera. By contrast, the term "virtual image" refers to an image rendered or generated by image processing at least one real image. The set of all real images, each real image captured by a different camera, are used to compose a model of the light field of the scene, through interpolation or three-dimensional model creation. FIG. 6A shows a perspective view of an example two-dimensional planar camera array 602 of a camera system operated to capture different perspective view real images of a cube 604. For the sake of simplicity and convenience, the face 606 of the cube 604 is oriented parallel to the plane of the camera array 602. Each camera captures a different perspective view real image of the cube 604. Image array 608 represents perspective view real images of the cube 604 captured by each camera of the camera array 602. For example, the perspective view real image of the cube 604 captured by the camera 612 is represented by the real image 610. The four perspective view real images 610 and 614-616 identified by X's in the image array 608 are enlarged in FIG. 6B. The collection of real images presented in the image array 608 is the four-dimensional light field of the cube 604, and subsets of real images can be used to generate perspective view virtual images of the cube 604 as if the virtual images were captured from different virtual camera locations.

Figure 7:
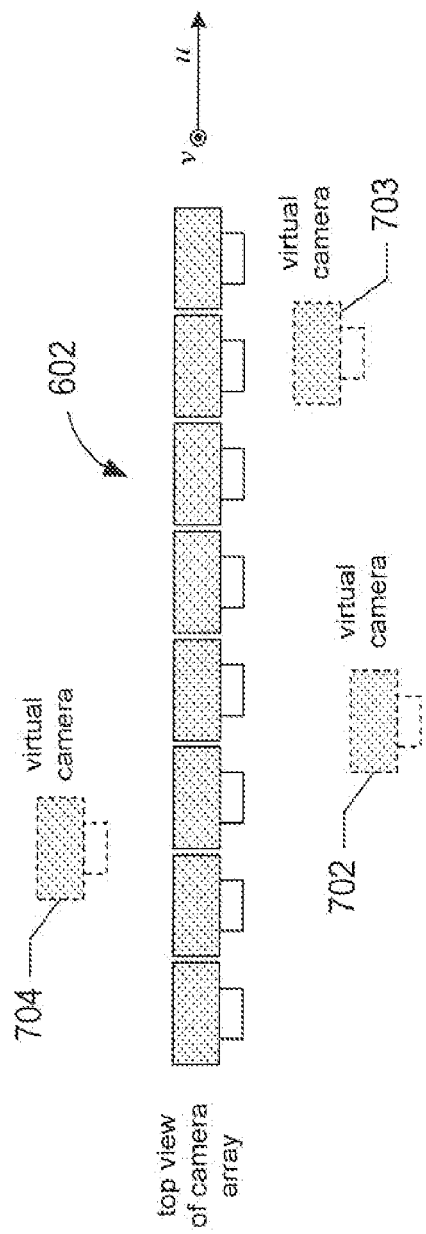
FIG. 7 shows a top view of a camera array and examples of virtual cameras.

Image processing of real images captured by a camera array enables the generation of perspective view virtual images as ft the virtual images where obtained from virtual cameras located at positions that are different from the positions of the cameras of the camera array. FIG. 7 shows a top view of the camera array 602. In the example of FIG. 7, the images captured by cameras in the camera array 602 can be processed to generate three different perspective view virtual images of a scene as if each of the virtual images are captured by one of the virtual cameras 702-704.

Figure 8A:
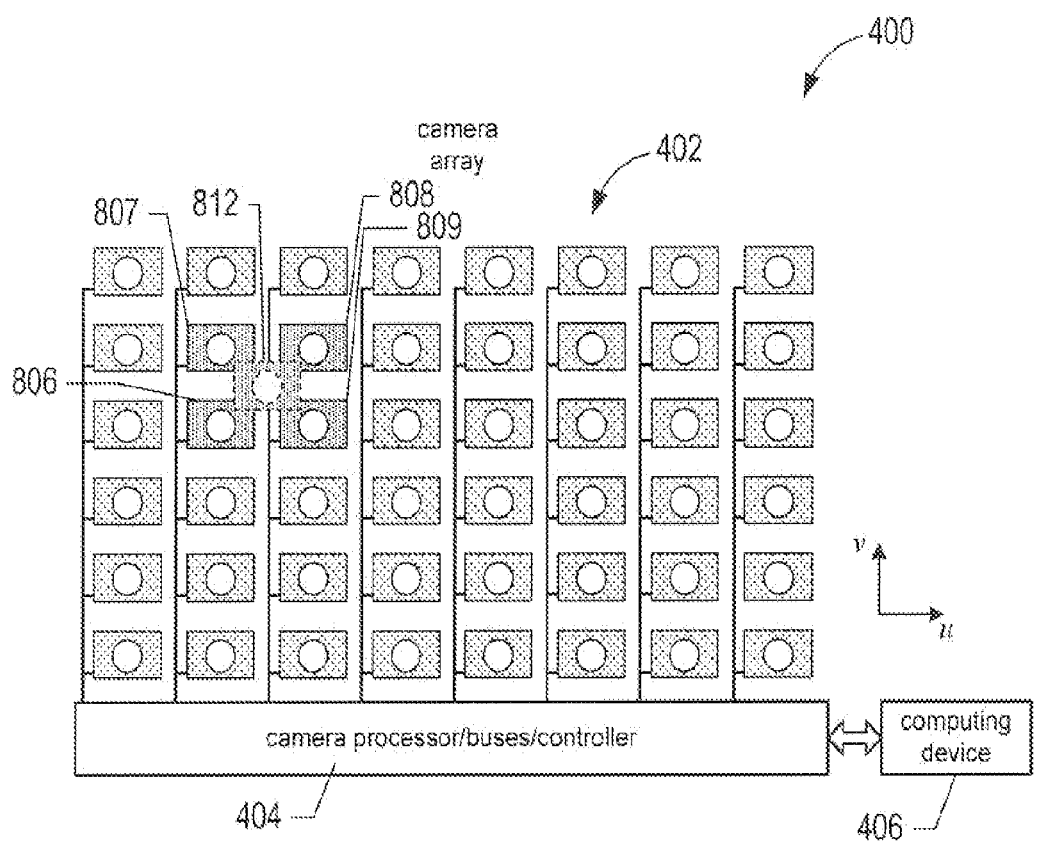
FIGS. 8A-8C show the camera system shown in FIG. 4A and an example of generating a virtual image from four real images.
Figure 8B:
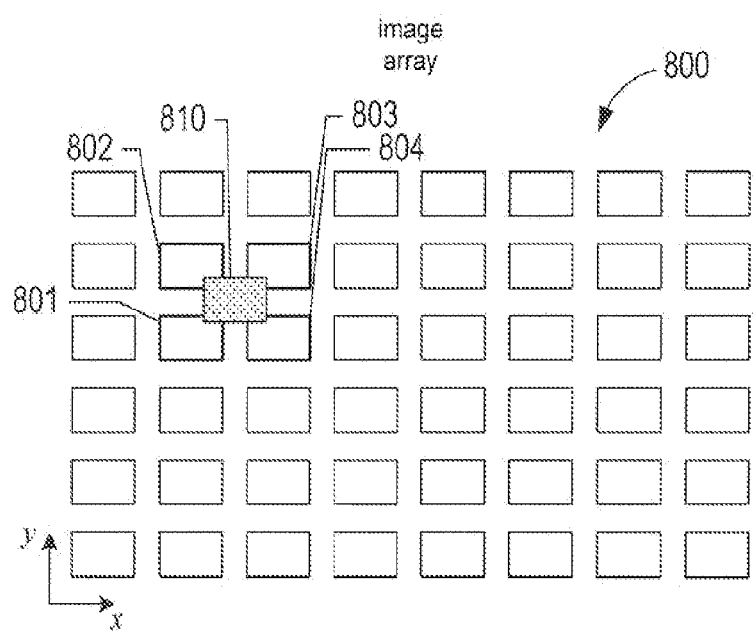

Camera systems of the present invention enable virtual view generation using only the image data associated with generating the virtual image of the virtual view. FIG. 8A shows the camera system 400 shown in FIG. 4A. FIG. 8B shows an array of real images 800 of a scene each real image captured by a corresponding camera in the camera array 402. For example, heavily bordered rectangles 801-804 shown in FIG. 8B represent real images captured by cameras 806-809, respectively, shown in FIG. 8A. Image data associated with real images 801-804 can be used to generate a virtual image 810, shown in FIG. 8B, with a perspective view of the scene that is different from the perspective views in the images 801-804. The virtual image 810 can be generated using the image data associated with real images 801-804 as if the image 810 had been captured by a virtual camera 812, shown in FIG. 8A. Rather than sending all of the image data captured by all 48 cameras of the camera array 402, the computing device 406 may send instructions to the camera processor/controller 404 indicating the perspective view to be generated or indicating that only certain image data captured by cameras 806-809 used to generate the virtual image 810. The camera processor 404 responds to the instructions sent b the computing device 406 by retrieving from the cameras 806-809 only the image data used to generate the virtual image 810, which the camera processor/controller 404 collects and sends to the computing device 406. The computing device 406 processes the image data to generate the virtual image 810. In the example shown in FIGS. 8A-8B, the images captured by the remaining cameras may not be needed in generating the virtual image 810. As a result, the camera processor/controller 404 may make no request that the remaining cameras send any image data.

Figure 8C:
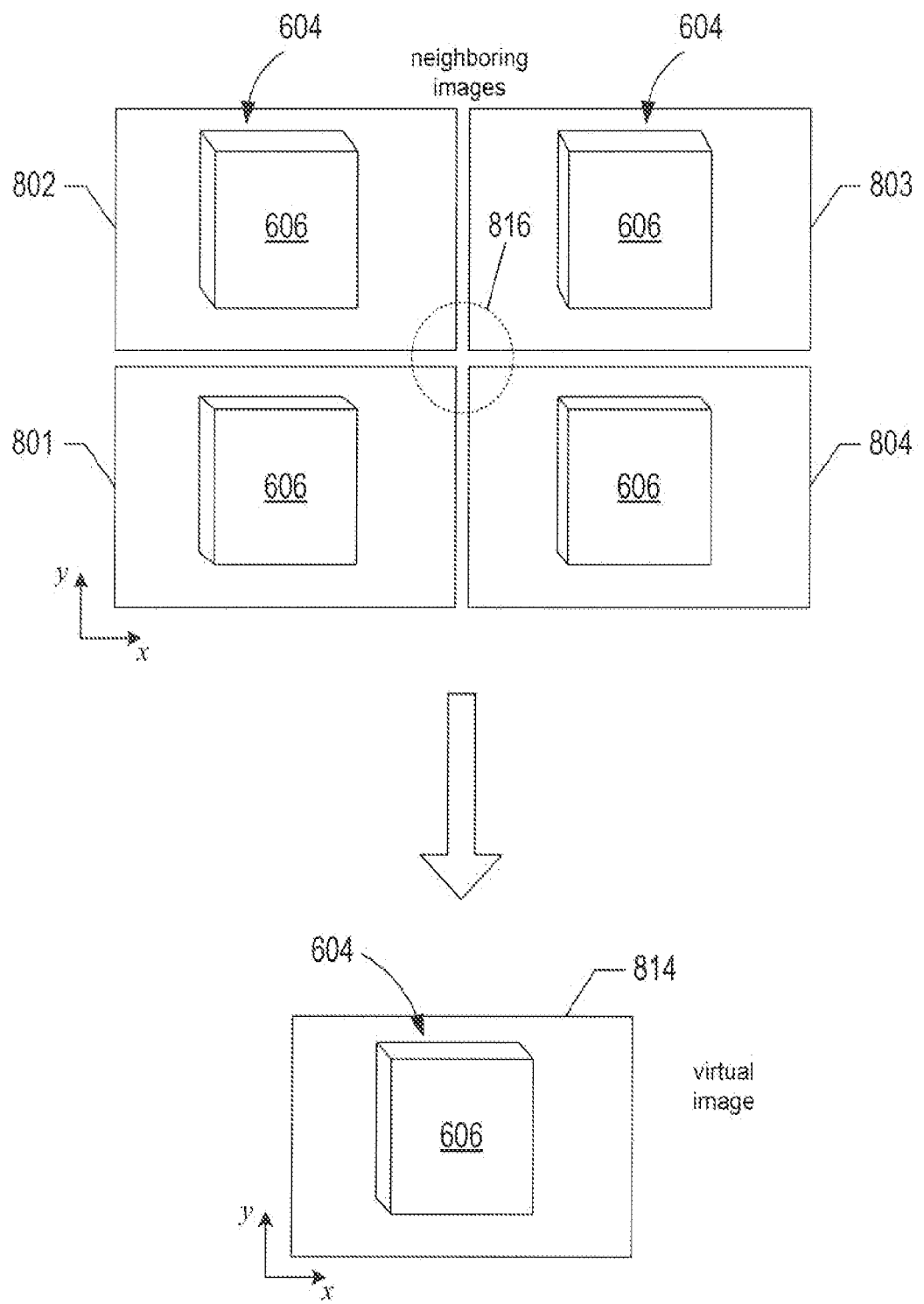

In order to further limit the amount of redundant image data, only certain portions of the image data obtained from the real images used in generating the virtual image may be sent to the computing device 406 for image processing. FIG. 8C shows an example of the four example real images 801-804 taken of the cube 604 described above with reference to FIG. 6. For the sake of simplicity, suppose that each real image contains substantially the an background and front surface or face 606 image data of the cube 604. On the other hand, because the real images 801-804 are each taken from different perspective views of the cube 604, each real image contains different image data associated with the to surface and side surface of the cube 604. As a result, in generating a virtual image 814 corresponding to virtual view 816, the camera processor/controller 404 may request that only one of the cameras is used to send image data corresponding to the background and front surface 606 of the cube 604 while the image data corresponding to the top surface and side of the cube 604 may be sent to the computing device 604 in order to generate the virtual image 814.

Figure 9:
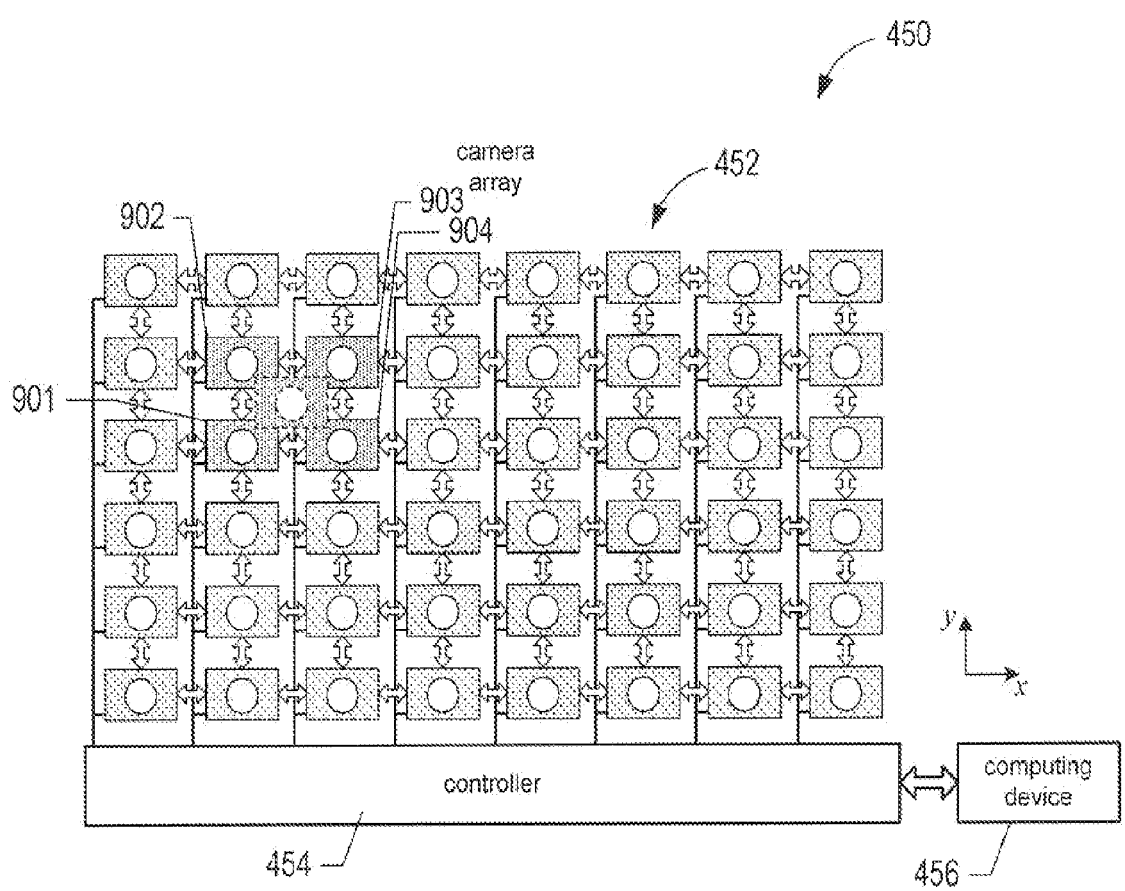
FIG. 9 shows the camera system shown in FIG. 4B operated to generate a virtual.

In alternative embodiments, the camera system 450 can be used to generate virtual image 810 as described above for the camera system 400 except, because each camera include at least one processor for image processing, the individual cameras share image data with neighboring cameras so that the image data needed to generate the virtual image 810 is sent from the appropriate cameras. FIG. 9 shows the camera system 450 shown in FIG. 4B. Like the camera system 400 described above, rather than sending all of the image data captured by all 48 cameras of the camera array 452, the computing device 456 may send instructions to all of the cameras indicating the perspective view to be generated or indicating that only certain image data captured by cameras 901-904 can be used to generate the virtual image 810. The cameras 901-904 capable of supplying the image data used to generate the virtual image 810 respond to the instructions sent by the computing device 456 by sending only the image data to be used in generating the virtual image 810, and the computing device 456 processes the image data received from the cameras 901-904 to generate the virtual image 810. The images captured by the remaining cameras may not be needed in generating the virtual image 810. As a result, the remaining cameras take no action in response to the instructions sent by the computing device 456.

Figure 10A:
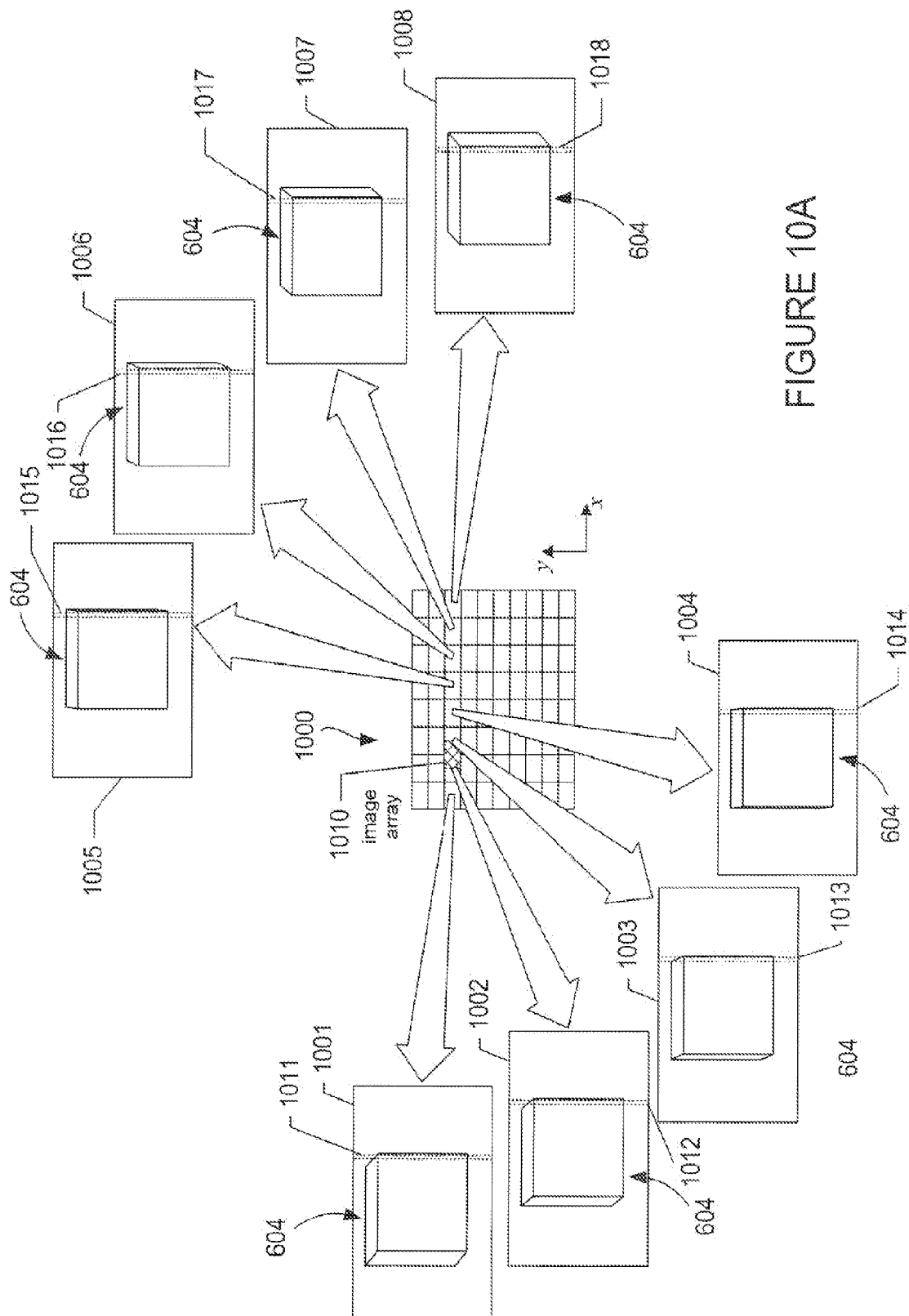
FIG. 10A shows an example image array and enlargements of a row of real images captured by a row of cameras in a camera system.
Figure 10B:
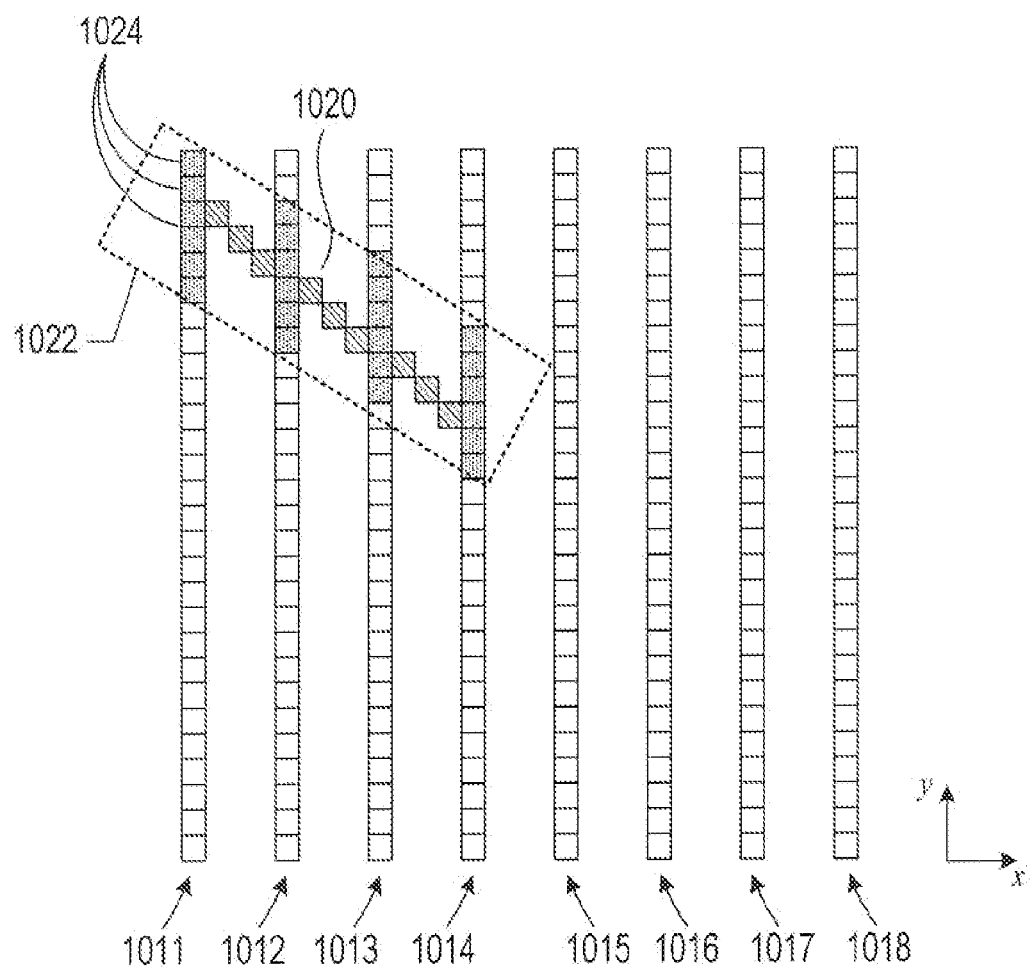
FIG. 10B shows columns of pixels associated with the row of real images shown in FIG. 10A used to interpolate a line.

The camera systems of FIGS. 8-9 are used to select real images that can be used in generating a virtual image. However, camera systems of the present invention can also be used to perform targeted selections of particular pixel data from the real images captured by the cameras of a camera array. FIG. 10A shows an image array 1000 and enlargements of a row of real images 1001-1008 captured by a row of cameras in a camera system, such as the camera systems 400 and 450. Each real image shows a different perspective view of the cube 604 for a fixed y-coordinate value. Consider performing view interpolation to generate a line segment in a virtual image 1010 located between real images 1002 and 1003. The vertical dotted lines 1011-1018 in each of the corresponding real images 1001-1008 represent a column of pixels for a fixed y-coordinate value. FIG. 10B shows the columns of pixels 1001-1008. Hash-marked pixels, such as pixels 1020 represent a line of an interpolated perspective view of the virtual image 1010, shown in FIG. 10. Interpolation is typically performed by selecting certain pixels in a neighborhood of the desired pixels. In the example of FIG. 10B, a neighborhood that can be used to interpolate a line in virtual image 1010 is outlined by dotted-line box 1022. Note that only a small subset of all the pixels represented h shaded pixels 1024 of the columns of pixels 1011-1018 are used to compute the interpolated line 1022. As a result, the camera system is operated so that only the shaded pixels are sent from the corresponding cameras of the camera array to the computing device for interpolating the line 1022.

Figure 11:
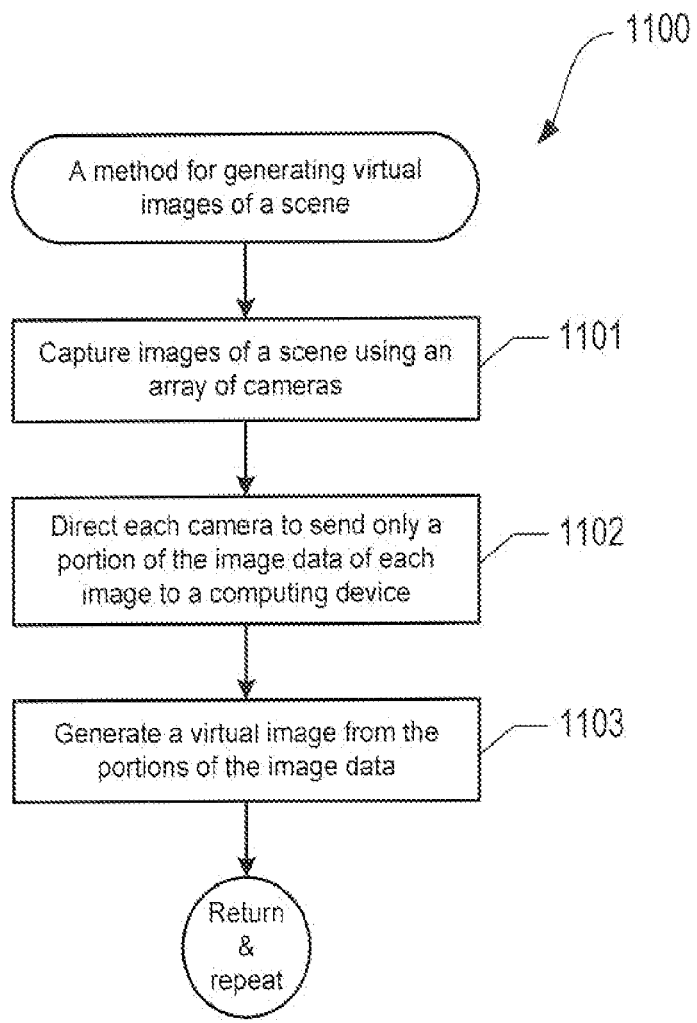
FIG. 11 shows a flow diagram summarizing a method for generating virtual images of a scene.

FIG. 11 shows a flow diagram summarizing a method for generating virtual images of a scene. In step 1101, images of a scene are captured using a camera array. Each image is captured by a camera from a different view point of the scene, as described above with reference to FIG. 6. In step 1102, each camera is directed to send only a portion of the image data captured by the camera to a computing device for image processing, as described above with reference to FIGS. 4 and 9. In step 1103, a virtual image of a perspective view of the scene not captured by the cameras is generated, as described above with reference to FIG. 8. The virtual image is formed from the portions of the image data captured by the cameras and sent to the computing device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A camera system comprising:
    a camera array;
    a camera processor/controller;
    a number of camera buses, each camera bus connects a subset of cameras of the camera array to the camera processor/controller over which the subset of cameras send image data and receive instructions; and
    a computing device connected to the camera processor/controller, wherein each camera can be operated to send to the camera processor/controller only the image data used by the computing device to generate virtual images and each camera receives the instructions from the camera processor/controller over a camera bus,
    wherein the computing device:
        determines, for a selected virtual image of a plurality of virtual images, the image data from the cameras from which the selected virtual image is to be generated;
        determines, for each portion of a plurality of portions of the image data, which of the cameras is able to provide the portion of the image data;
        when more than one camera is able to provide a given portion of the image data, select a given camera of the more than one camera to provide the given portion; and
        instruct the controller to control the cameras to provide the image data.

2. The system of claim 1, wherein the camera processor/controller sends the image data received from the cameras to the computing device.

3. The system of claim 1, wherein the camera processor/controller sends instructions to each camera of the camera array over a camera bus connected to the camera.

4. The system of claim 1, wherein the camera processor/controller receives image data from each camera of the camera array over a camera bus connected to the camera.

5. The system of claim 1, wherein the camera processor/controller controls the operation of each camera of the camera array by sending instructions to each camera of the camera array over a camera bus.

6. The camera system of claim 1, wherein the computing device is to determine, for a particular virtual image, a portion of the image data needed from each camera to generate the virtual image, and directs each camera to send only the determined portion of the image data.

7. A camera system comprising:
    a camera array, wherein each camera is electronically connected to at least one adjacent camera and each camera includes one or more processors;
    a controller;
    a number of camera buses, each camera bus connecting a subset of cameras of the camera array to the controller over which the subset of cameras send image data and receive instructions; and
    a computing device connected to the controller, wherein each camera can be operated to send to the controller only the image data used by the computing device to generate virtual images and receive the instructions from the controller over a camera bus,
    wherein the computing device:
        determines, for a selected virtual image of a plurality of virtual images, the image data from the cameras from which the selected virtual image is to be generated;
        determines, for each portion of a plurality of portions of the image data, which of the cameras is able to provide the portion of the image data;
        when more than one camera is able to provide a given portion of the image data, select a given camera of the more than one camera to provide the given portion; and
        instruct the controller to control the cameras to provide the image data.

8. The system of claim 7, wherein each camera sends image data to and receives image data from adjacent connected cameras, the image data comprising data of images captured by another camera of the array.

9. The system of claim 7, wherein each camera processes image data captured by the camera and image data received from adjacent connected cameras.

10. The system of claim 7, wherein the controller sends image data received from the cameras to the computing device and sends instructions sent from the computing device to individual cameras.

11. The system of claim 7, wherein the controller sends instructions to each camera of the camera array over a camera bus connected to the camera.

12. The system of claim 7, wherein the controller controls the operation of each camera of the camera array by sending instructions to each camera of the camera over a camera bus.

13. The system of claim 7, wherein, for each camera of at least one camera, the portion of the image data provided by the camera is less than a complete image captured by the camera.

14. The system of claim 7, wherein the given camera comprises just one camera.

15. The system of claim 7, wherein the given camera is selected to provide the given portion to reduce redundant image data from being sent to the computing device.

16. A method for generating virtual images of a scene, the method comprising:

capturing images of a scene, wherein each image is captured by a camera of a camera array and each image is of a different view point of the scene;

determining a portion of the image data captured by each camera of the camera array needed to generate a particular virtual image of a plurality of virtual images;

determining, for each portion of a plurality of portions of the image data which of the cameras is able to provide the portion of the image data;

when more than one camera is able to provide a given portion of the image data, selecting a given camera of the more than one camera to provide the given portion;

directing each camera of the camera array to send only the determined portion of the image data captured by the camera to a computing device; and generating the particular virtual image of a perspective view of the scene not captured by the cameras using the computing device, wherein the virtual image is formed from the portions of the image data captured by the cameras and sent to the computing device.

17. The method of claim 16 further comprising sending the image data from each camera to the computing device over a data bus that connects at least one camera of the camera array to the computing device.

18. The method of claim 16 further comprising each camera processing image data captured by the camera and processing image data received from adjacent connected cameras.

19. The method of claim 16, wherein directing each camera of the camera array to send only a portion of the image data captured by the camera further comprises directing each camera to send only the image data used to generate the virtual image.

20. The method of claim 16, wherein for the particular virtual image, no image data is needed from one or more of the cameras.

* * * * *